(12) United States Patent
Huang et al.

(10) Patent No.: US 9,175,825 B2
(45) Date of Patent: Nov. 3, 2015

(54) ANTI-GLARE LIGHT SOURCE

(71) Applicants: Hieng-Hsiung Huang, Hsinchu (TW);
Ming-Chuan Lin, Taichung (TW);
Zhi-Ting Ye, Miaoli County (TW)

(72) Inventors: Hieng-Hsiung Huang, Hsinchu (TW);
Ming-Chuan Lin, Taichung (TW);
Zhi-Ting Ye, Miaoli County (TW)

(73) Assignee: WINTEK CORPORATION, Taichung (TW)

( * ) Notice: Subject to any disclaimer, the term of this patent is extended or adjusted under 35 U.S.C. 154(b) by 137 days.

(21) Appl. No.: 14/135,581

(22) Filed: Dec. 20, 2013

(65) Prior Publication Data

US 2014/0177259 A1 Jun. 26, 2014

(30) Foreign Application Priority Data

Dec. 20, 2012 (TW) .............................. 101148802 A

(51) Int. Cl.
*F21V 5/02* (2006.01)
*F21V 8/00* (2006.01)
*F21V 14/06* (2006.01)
*F21V 13/04* (2006.01)

(52) U.S. Cl.
CPC . *F21V 5/02* (2013.01); *F21V 14/06* (2013.01); *G02B 6/0005* (2013.01); *G02B 6/0096* (2013.01); *F21V 13/04* (2013.01); *G02B 6/001* (2013.01)

(58) Field of Classification Search
CPC ................................. F21V 5/02; G02B 6/0096
USPC ............................................. 362/551, 217.04
See application file for complete search history.

(56) References Cited

U.S. PATENT DOCUMENTS 4,054,793 A * 10/1977 Shemitz .......................... 362/127
8,876,339 B2 * 11/2014 Boonekamp et al. .......... 362/355

FOREIGN PATENT DOCUMENTS

TW 201348649 12/2013

* cited by examiner

*Primary Examiner* — David V Bruce
(74) *Attorney, Agent, or Firm* — Ming Chow; Sinorica, LLC

(57) ABSTRACT

An anti-glare light source including a linear light source, at least one sleeve and a light adjusting element is provided. The linear light source is suitable for providing a light. The sleeve covers at least one end of the linear light source. The light adjusting element is disposed between the sleeve and the linear light source, wherein the light adjusting element includes a plurality of prism portions. The prism portions cover a portion of the linear light source and arrange along the extension direction of the linear light source, such that the distribution of the light converges along the extension direction of the linear light source.

16 Claims, 3 Drawing Sheets

ANTI-GLARE LIGHT SOURCE

CROSS-REFERENCE TO RELATED APPLICATION

This application claims the priority benefit of Taiwan application serial no. 101148802, filed on Dec. 20, 2012. The entirety of the above-mentioned patent application is hereby incorporated by reference herein and made a part of this specification.

BACKGROUND OF THE INVENTION

1. Field of the Invention

The present invention generally relates to a light source. More particularly, the present invention relates to an anti-glare light source.

2. Description of Related Art

Since Edison invented the lamp, the people continually devotes to develop many kinds of light sources to meet many kinds of demands, and the invention of the light emitting diode (LED) realizes a light source having a smaller volume and a high luminous efficiency. Hence, the light emitting diode is already applied in many kinds of illumination apparatuses. However, the volume of the light emitting diode is smaller than a conventional lamp and a fluorescence lamp relatively, and the diverging angle of the light emitting diode is usually smaller than the diverging angles of the conventional lamp and the fluorescence lamp, too. Hence, the light emitting diode usually collocates with other optical elements to change the lighting pattern of the light emitting diode. Because the light emitting diodes are disposed in two ends of the light guide bar, the lamp using the light emitting diodes tends to cause a user observing the side-view light leakage (namely, a glare) of the light emitting diode lamp. As a result, the user suffers discomfort, and the vision of the user is even influenced. Generally speaking, the harsh glare obviously damages health of the vision of the eye in 30~60 seconds. Therefore, it is a problem to be urgently solved how to develop the light emitting diode lamp saving electric power and emitting a low glare simultaneously.

SUMMARY OF THE INVENTION

The present invention provides an anti-glare light source which is suitable for providing a low glare light source.

The present invention provides an anti-glare light source including a linear light source, at least one sleeve and a light adjusting element. The linear light source is suitable for providing a light. The sleeve covers at least one end of the linear light source. The light adjusting element is disposed between the sleeve and the linear light source, wherein the light adjusting element includes a plurality of prism portions, and the prism portions are arranged along an extension direction of the linear light source and cover a portion of the linear light source, such that a distribution of the light converges along the extension direction of the linear light source.

In one embodiment of the present invention, the linear light source includes a light guide bar and at least one light source disposed in the at least one end of the light guide bar and located in the sleeve.

In one embodiment of the present invention, an inner wall of the sleeve is a rough surface, and the roughness (Ra) of the inner wall is between 0.1 mm and 100 mm.

In one embodiment of the present invention, each of the prism portions is strip prism portions, and an extension direction of each of the strip prism portions is not parallel to the extension direction of the linear light source.

In one embodiment of the present invention, each of the strip prism portions is an arc structure, so as to cover a side of the linear light source.

In one embodiment of the present invention, each of the strip prism portions is a ring structure, so as to cover and surround a side of the linear light source.

In one embodiment of the present invention, a dimension of the light adjusting element in the extension direction of the linear light source is between 5 mm and 15 mm.

In one embodiment of the present invention, an inner wall of the sleeve is parallel to the extension direction of the linear light source, and a vertex angle of each of the prism portions is between 120 degrees and 160 degrees.

In one embodiment of the present invention, an inner wall of the sleeve is not parallel to the extension direction of the linear light source, a minimum distance between each point of the inner wall of the sleeve and the linear light source increases gradually from the end of the linear light source covered by the sleeve toward another end of the linear light source, and a vertex angle of each of the prism portions is between 90 degrees and 120 degrees.

In one embodiment of the present invention, an inner wall of the sleeve is parallel to the extension direction of the linear light source, and a vertex angle of each of the prism portions is between 120 degrees and 160 degrees.

In one embodiment of the present invention, an inner wall of the sleeve is not parallel to the extension direction of the linear light source, a minimum distance between each point of the inner wall of the sleeve and the linear light source increases gradually from the at least one end of the linear light source covered by the sleeve toward another end of the linear light source, and a vertex angle of each of the prism portions is between 90 degrees and 150 degrees.

In one embodiment of the present invention, an included angle between the side of the inner wall of the sleeve and the extension direction of the linear light source is between 5 degrees and 10 degrees.

In one embodiment of the present invention, a vertex angle of each of the strip prism portions is between 90 degrees and 160 degrees.

In an embodiment of the invention, the anti-glare light source further includes a reflective layer disposed on a portion of a side of the linear light source.

In one embodiment of the present invention, the strip prism portions are parallel to each other.

In one embodiment of the present invention, the extension direction of each of the strip prism portions is substantially perpendicular to the extension direction of the linear light source.

In view of the foregoing, the anti-glare light source of one embodiment of the present invention utilizes the strip prism portions of the light adjusting element disposed between the sleeve and the linear light source to cover a portion of the linear light source, such that a distribution of the light converges along the extension direction of the linear light source and a glare observed by user at a small elevation angle is diminished to be beneficial to improve the light-emitting quality.

In order to make the aforementioned and other features and advantages of the invention more comprehensible, embodiments accompanying figures are described in detail below.

DESCRIPTION OF EMBODIMENTS

Figure 1A:
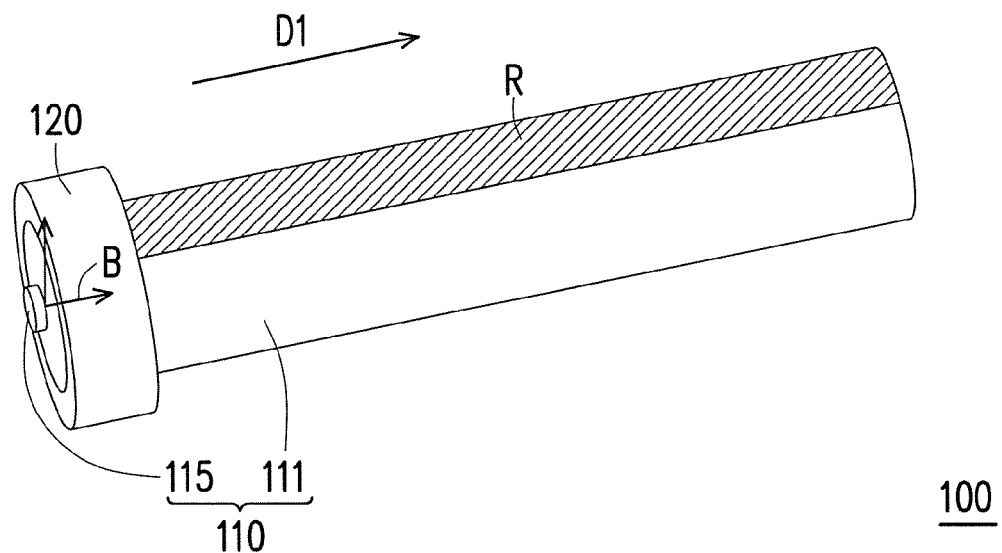
FIG. 1A is a schematic three-dimensional view illustrating an anti-glare light source according to one embodiment of the present invention.
Figure 1B:
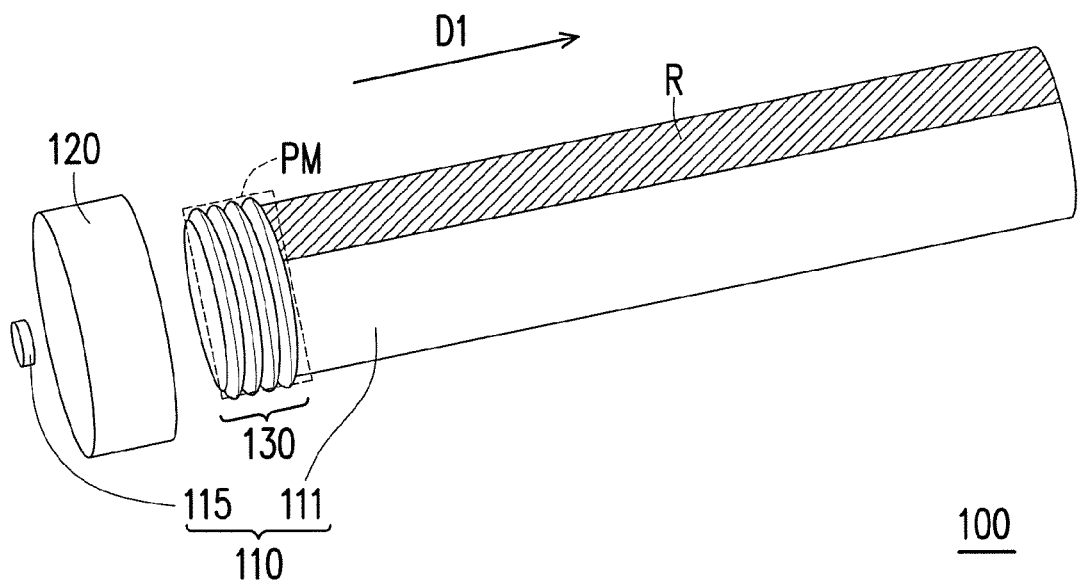
FIG. 1B is a perspective exploded view of the anti-glare light source of FIG. 1A.

FIG. 1A is a schematic three-dimensional view illustrating an anti-glare light source according to one embodiment of the present invention, and FIG. 1B is a perspective exploded view of the anti-glare light source of FIG. 1A. Referring to FIG. 1A and FIG. 1B, an anti-glare light source 100 of the present embodiment includes a linear light source 110, at least one sleeve 120 and a light adjusting element 130. The linear light source 110 is suitable for providing a light B. In the present embodiment, for example, the linear light source 110 may include a light guide bar 111 and at least one light source 115, and the light source 115 may be disposed in at least one end of the light guide bar 111 and located in the sleeve 120. The sleeve 120 may cover at least one end of the linear light source 110. In the present embodiment, the light source 115 and the sleeve 120 is, for example, disposed in one end of the light guide bar 111, but the present invention is not limited thereto. In other embodiments, both of the light source 115 and the sleeve 120 may be disposed in two ends of the light guide bar 111 at the same time. The lighting adjusting element 130 may be disposed between the sleeve 120 and the linear light source 110. It should be noted that the light adjusting element 130 of FIG. 1A may be, for example, fully covered by the opaque sleeve 120 and is not easy to be observed directly. However, in other embodiments, the light adjusting element 130 may exceed a range covered by the sleeve 120 and be observed directly, but the present invention is not limited thereto. For example, a dimension of the light adjusting element 110 in the extension direction D1 of the linear light source 110 is between 5 mm and 15 mm. In the present embodiment, the light source 115 is, for example, a light-emitting diode, and the light guide bar 111 may be fabricated by extrusion molding, but the invention is not limited thereto.

Figure 1C:
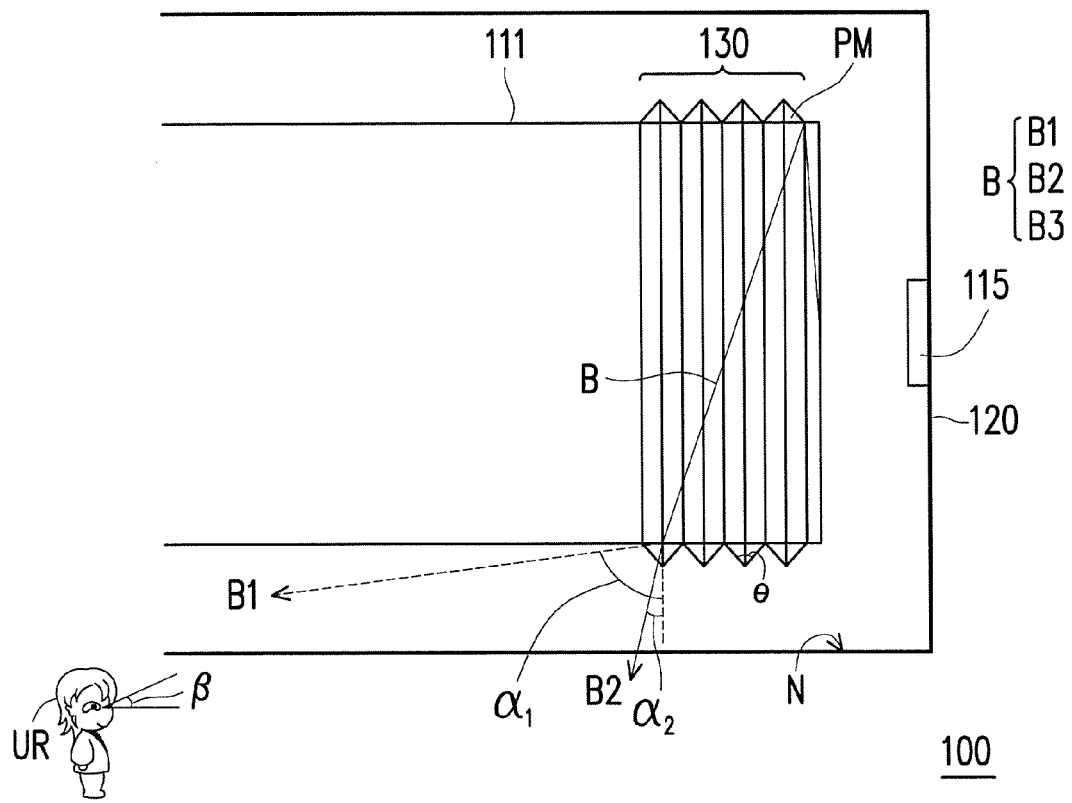
FIG. 1C is a vertical sectional view showing the anti-glare light source of FIG. 1A.

FIG. 1C is a vertical sectional view showing the anti-glare light source of FIG. 1A. Referring to FIG. 1B and FIG. 1C, the light adjusting element 130 may include a plurality of strip prism portions PM parallel to each other, the strip prism portions PM are arranged along the extension direction D1 of the linear light source 110 and cover a portion of the linear light source 110, and the extension direction of each of the strip prism portions PM is substantially perpendicular to the extension direction D1 of the linear light source 110, such that a distribution of the light B converges along the extension direction D1 of the linear light source 110. For example, referring to FIG. 1C, in the present embodiment, when the light B emitted by the light source 115 transmits from the inner of the light guide bar 111 toward the outside of the light guide bar 111, the strip prism portions PM can change the transmission direction of the light B1 transmitted to the sleeve 120 by large incident angle $\alpha_1$ to the transmission direction of the light B2 transmitted to the sleeve 120 by smaller incident angle $\alpha_2$. With such configuration, the user UR located under the anti-glare light source 100 observing the light B(a glare) emitted by the anti-glare light source 100 at a small elevation angle can be avoided. In other ward, the light adjusting element 130 of the anti-glare light source 100 causes a distribution of the light to converge along the extension direction D1 of the linear light source 110 to a certain extent. As shown in FIG. 1C, the light B2 does not tend to cause the user UR to observe the glare at a small elevation angle comparing with the light B1.

Figure 1D:
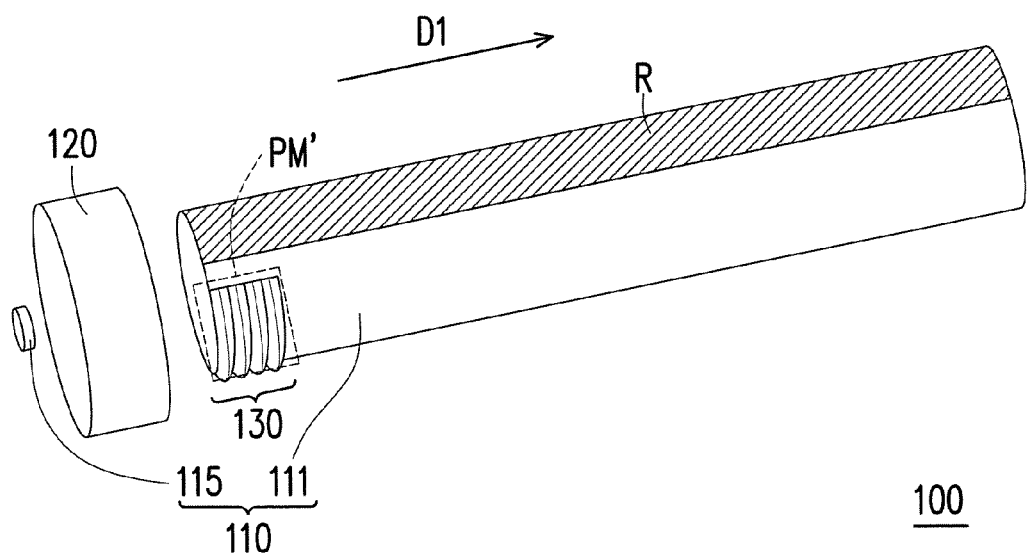
FIG. 1D illustrates a modified embodiment of the anti-glare light source of FIG. 1A.

FIG. 1D illustrates a modified embodiment of the anti-glare light source of FIG. 1A. Referring to FIG. 1B and FIG. 1D, in detail, in the present embodiment, as shown in FIG. 1B, each of the strip prism portions PM is a ring structure, so as to cover and surround a side of the linear light source 110. Moreover, the anti-glare light source 100 may further include a reflective layer R disposed on a portion of a side of the linear light source 110. For example, in the present embodiment, the reflective layer R may be disposed on the upper half of the light guide bar 111, as shown in FIG. 1A and FIG. 1B. As such, the reflective layer R can reflect the light B transmitted in the light guide bar 111 and tended to emit from the upper half of the light guide bar 111, and cause the light B to be emitted from the under half of the light guide bar 111. In other ward, the reflective layer R can improve the illumination at a specific direction of the anti-glare light source 100. For example, the reflective layer R may use polyethylene terephthalate (PET) reflective material, Polycarbonate (PC) white reflective material, or metal coating etc. having a good reflectivity and applied on the light guide bar 111, but the invention is not limited thereto. Referring to FIG. 1D again, the strip prism portion PM' is similar to the strip prism portion PM shown in FIG. 1B. However, the strip prism portion PM' shown in FIG. 1D is an arc structure, so as to cover a side of the linear light source 110 rather than surround the linear light source 110. For example, in the anti-glare light source 100 shown in FIG. 1D, because the light B is reflected by the reflective layer R, the strip prism portions PM' are only need to be disposed on a region which is not covered by the reflective layer R. As such, the weight and amount of the strip prism portions PM' can be reduced. The material of the strip prism portions PM (and PM') may be transparent materials and have index of refraction similar or the same to the light guide bar 111. The light guide bar 111 can be lightweight further. It should be noted that dimensions and rates of the light source 115, the light guide bar 111, the reflective layer R and the strip prism portions PM (and PM')are only examples for illustrating the present embodiment and not intended to limit the present invention.

Referring to FIG. 1C again, in detail, in the present embodiment, a vertex angle θ of each of the strip prism portions PM is between 90 degrees and 160 degrees. More specifically, the variation of vertex angle θ causes the light outlet route of the light B to change. However, because the strip prism portions PM are covered by the opaque sleeve 120, when the light outlet route of the light B2 transmits to the sleeve 120 by a smaller incident angle $\alpha_2$, the light B2 tends to be absorbed after being reflected by the inner wall N of the sleeve 120 twice. As a result, the luminous efficiency of the anti-glare light source 100 is reduced. Therefore, at least one portion of the inner wall N of the sleeve 120 may be roughed for remaining the luminous efficiency of the anti-glare light source 100. For example, in the present embodiment, the inner wall N of the sleeve 120 which the light is transmitted to by smaller incident angle may be a rough surface, and the roughness (Ra) of the inner wall N is between 0.1 mm and 100 mm. As such, the light B can be scattered by the inner wall N of the sleeve 120, such that a portion of the light B enters the light guide bar 111 of the linear light source 110 to transmit again. At the same time, the sleeve 120 can also cover the other undesired stray light and the light emitted from the light adjusting element 130, and is be beneficial to remain the luminous efficiency and diminish the glare in a normal direction. Moreover, the sleeve 120 also has a function of protecting and fixing elements in the anti-glare light source.

Figure 2A:
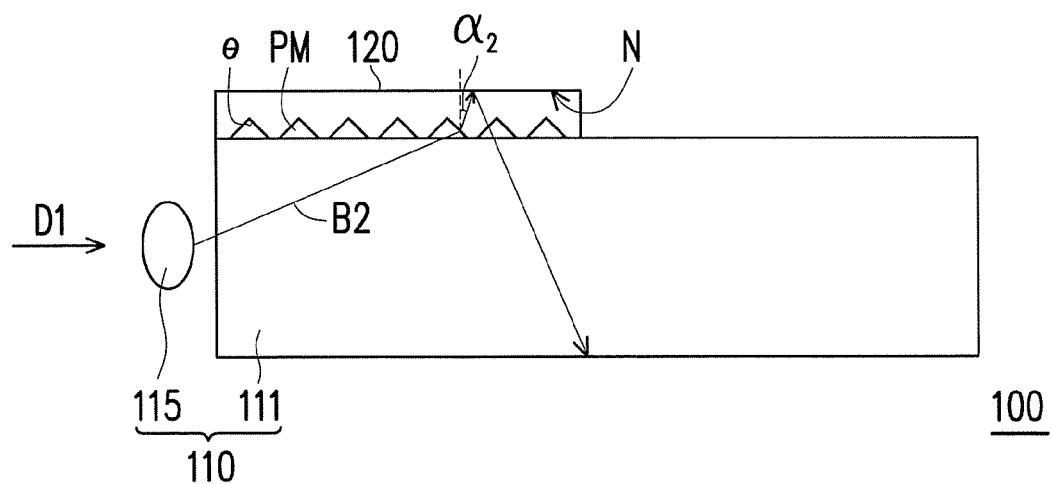
FIG. 2A illustrates a light route in the anti-glare light source of FIG. 1A.
Figure 2B:
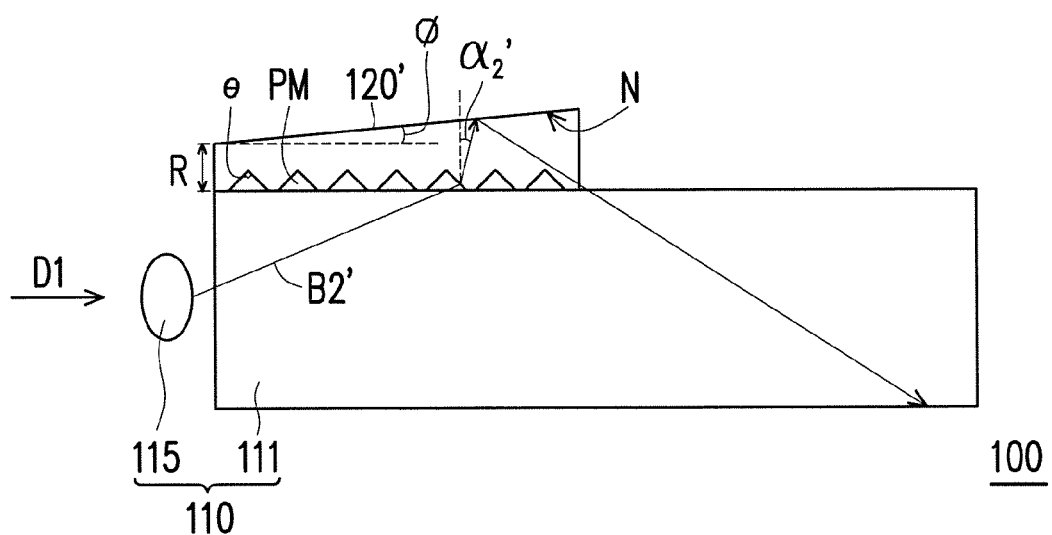
FIG. 2B illustrates a light route in a modified embodiment of the anti-glare light source of FIG. 1A.

Moreover, FIG. 2A illustrates a light route in the anti-glare light source of FIG. 1A, and FIG. 2B illustrates a light route in a modified embodiment of the anti-glare light source of FIG. 1A. Referring to FIG. 1C, FIG. 2A and FIG. 2B, further, in the present embodiment, the inner wall N of the sleeve 120 may be parallel to the extension direction D1 of the linear light source 110, and a vertex angle θ of each of the strip prism portions PM is between 120 degrees and 160 degrees, so as to change the light outlet route of the light B2 for improving the problem of the side-view glare. However, the incident angle $α_2$ of the light B2 is also relatively larger, because the said vertex angle θ is larger comparing with the angle which is between 90 degrees and 120 degrees. Hence, the light B2 being converged excessively resulting in the light B2 tending to being absorbed after reflecting by the inner wall N of the sleeve 120 twice can be avoid, such that the light B2 can be transmitted to the inner wall N of the sleeve 120 with suitable incident angle $α_2$. As shown in FIG. 1C and FIG. 2A, the light B2 entering the light guide bar 111 of the linear light source 110 to transmitting again by being reflecting by the inner wall N is also benefit to remain the luminous efficiency.

Further, in the present embodiment, an inner wall N of the sleeve 120' may not be parallel to the extension direction D1 of the linear light source 110. As shown in FIG. 2B, a minimum distance R between each point of the inner wall N of the sleeve 120' and the linear light source 110 increases gradually from one end of the linear light source 110 covered by the sleeve 120' toward another end of the linear light source 110. The inclined angle ω between the side of inner wall N of the sleeve 120' and the extension direction D1 of the linear light source 110 may be between 5 degrees and 10 degrees. In other word, the incident angle which the light B2' be transmitted to the sleeve 120' with can be directly changed by changing the inclined angle φ between the side of inner wall N of the sleeve 120' and the extension direction D1 of the linear light source 110. At this moment, a vertex angle θ' of each of the strip prism portions PM is between 90 degrees and 120 degrees. As such, the light B2' can be transmitted to the inner wall N of the sleeve 120' with a smaller incident angle $αa_2$ comparing with the light B1 of FIG. 1C, and enter the light guide bar 111 of the linear light source 110 again by being reflected by the inclined inner wall N of the sleeve 120', so as to improve the problem of the side-view glare and be benefit to remain the luminous efficiency.

It should be noticed that the extension direction of the strip prism portion is not need to be substantially perpendicular to the extension direction of the linear light source in other embodiments which are not illustrated. Namely, the inclined angle between the extension direction of the strip prism portion and the extension direction of the linear light source may be greater than 0 degree. (Namely, the extension direction of the strip prism portion and the extension direction of the linear light source may be not parallel.). The angle is preferably greater than 45 degree, such that a portion of the light still converges in the extension direction of the linear light source. Moreover, the strip prism portions must not be parallel to each other. Namely, the extension directions of the strip prism portions may be different. The strip prism portion is not limited to a straight line shape shown in FIG, and may be curved shape or other irregular shape. Furthermore, the strip prism portions may vary depending on the distance between the light source and the strip prism portions. For example, the dimension, the vertex angle, the extension direction, the shape, the density, the gap of the strip prism portions may vary depending on the distance between the light source and the strip prism portions.

It should be noted that the strip prism portions may be replaced by a plurality of individual prism portions, for example, a plurality of individual triangle prisms or cone prisms in other embodiments which are not illustrated. Because individual prism portion has a plurality of prism surface, even full peripheral cone prisms surface, a distribution of the linear light source can still converge along the extension direction of the linear light source. To sum up, the anti-glare light source in one embodiment of the present invention utilizes individual prism portions or stripe prism portions to refract the light emitted from the side of the light guide bar, such that user observing the glare can be avoid. At the same time, users directly observing the light leakage of the prism portions can avoid by the sleeve protecting and covering the prism portions, so as to remain the uniformity of light emitting, reduce the glare observed by user at a smaller elevation angle and remain the quality of the light emitted.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An anti-glare light source, comprising:
    a linear light source suitable for providing a light;
    at least one sleeve covering at least one end of the linear light source;
    a light adjusting element disposed between the at least one sleeve and the linear light source, wherein the light adjusting element comprises a plurality of prism portions, and the prism portions are arranged along an extension direction of the linear light source and cover a portion of the linear light source such that a distribution of the light converges along the extension direction of the linear light source.

2. The anti-glare light source as claimed in claim 1, wherein the linear light source comprises:
    a light guide bar; and
    at least one light source disposed in the at least one end of the light guide bar and located in the at least one sleeve.

3. The anti-glare light source as claimed in claim 1, wherein an inner wall of the at least one sleeve is a rough surface, and a roughness of the inner wall is between 0.1 mm and 100 mm.

4. The anti-glare light source as claimed in claim 1, wherein each of the prism portions is a strip prism portion, and an extension direction of each of the strip prism portions is not parallel to the extension direction of the linear light source.

5. The anti-glare light source as claimed in claim 4, wherein each of the strip prism portions is an arc structure, so as to cover a side of the linear light source.

6. The anti-glare light source as claimed in claim 4, wherein each of the strip prism portions is a ring structure, so as to cover and surround a side of the linear light source.

7. The anti-glare light source as claimed in claim 1, wherein a dimension of the light adjusting element in the extension direction of the linear light source is between 5 mm and 15 mm.

8. The anti-glare light source as claimed in claim 1, wherein an inner wall of the at least one sleeve is parallel to the extension direction of the linear light source, and a vertex angle of each of the prism portions is between 120 degrees and 160 degrees.

9. The anti-glare light source as claimed in claim 1, wherein an inner wall of the at least one sleeve is not parallel to the extension direction of the linear light source, a minimum distance between each point of the inner wall of the at least one sleeve and the linear light source increases gradually from the at least one end of the linear light source covered by the sleeve toward another end of the linear light source, and a vertex angle of each of the prism portions is between 90 degrees and 120 degrees.

10. The anti-glare light source as claimed in claim 4, wherein an inner wall of the at least one sleeve is parallel to the extension direction of the linear light source, a vertex angle of each of the strip prism portions is between 120 degrees and 160 degrees.

11. The anti-glare light source as claimed in claim 4, wherein an inner wall of the at least one sleeve is not parallel to the extension direction of the linear light source, a minimum distance between each point of the inner wall of the at least one sleeve and the linear light source increases gradually from the at least one end of the linear light source covered by the at least one sleeve toward another end of the linear light source, and a vertex angle of each of the strip prism portions is between 90 degrees and 120 degrees.

12. The anti-glare light source as claimed in claim 11, wherein an included angle between the side of the inner wall of the at least one sleeve and the extension direction of the linear light source is between 5 degrees and 10 degrees.

13. The anti-glare light source as claimed in claim 1, wherein a vertex angle of each of the prism portions is between 90 degrees and 160 degrees.

14. The anti-glare light source as claimed in claim 1, further comprising a reflective layer disposed on a portion of a side of the linear light source.

15. The anti-glare light source as claimed in claim 4, wherein the strip prism portions are parallel to each other.

16. The anti-glare light source as claimed in claim 4, wherein the extension direction of each of the strip prism portions is substantially perpendicular to the extension direction of the linear light source.

* * * * *